United States Patent [19]
Price

[11] Patent Number: 5,646,455
[45] Date of Patent: Jul. 8, 1997

[54] TIMER CONTROLLED HEATING AND COOLING APPARATUS FOR AN AUTOMOBILE

[76] Inventor: Alan Price, 7 Aldeburgh Close South Fens, Hartlepool Cleveland, England, TS25 2RG

[21] Appl. No.: 526,207

[22] Filed: Sep. 11, 1995

[51] Int. Cl.$^6$ ........................ B60H 1/00
[52] U.S. Cl. ............ 307/10.1; 62/3.61; 62/244; 165/42; 219/202; 307/141.4
[58] Field of Search ............ 307/9.1, 10.1, 307/10.6, 141, 141.4; 290/38 C; 123/179.1–179.4; 392/379; 219/202, 201; 165/41, 42; 431/67; 62/243, 239, 3.61, 244

[56] References Cited

U.S. PATENT DOCUMENTS

| | | | |
|---|---|---|---|
| 3,683,887 | 8/1972 | Sammut | 431/67 |
| 3,685,606 | 8/1972 | Blow, Jr. | 290/38 C |
| 4,562,957 | 1/1986 | Nakagawa et al. | 219/202 |
| 5,000,139 | 3/1991 | Wong | 307/10.6 |
| 5,206,476 | 4/1993 | Fresch et al. | 219/202 |
| 5,373,703 | 12/1994 | Pal | 62/239 |
| 5,377,641 | 1/1995 | Salazar | 307/10.6 |
| 5,463,203 | 10/1995 | Moore | 219/202 |

*Primary Examiner*—Richard T. Elms

[57] ABSTRACT

A timer controlled heating and cooling apparatus for an automobile comprised of a control panel secured to a dashboard of an automobile. The control panel has an activation switch thereon. The control panel is secured in a position accessible to a driver. At least one thermo electric mechanism is mounted to an underside of a dashboard of an automobile. The thermo electric mechanism is electrically coupled to the control panel and to an existing car battery. The thermo electric mechanism serves to control the temperature of an interior of an automobile. At least one vent is secured to a front surface of a corresponding thermo electric mechanism.

1 Claim, 3 Drawing Sheets

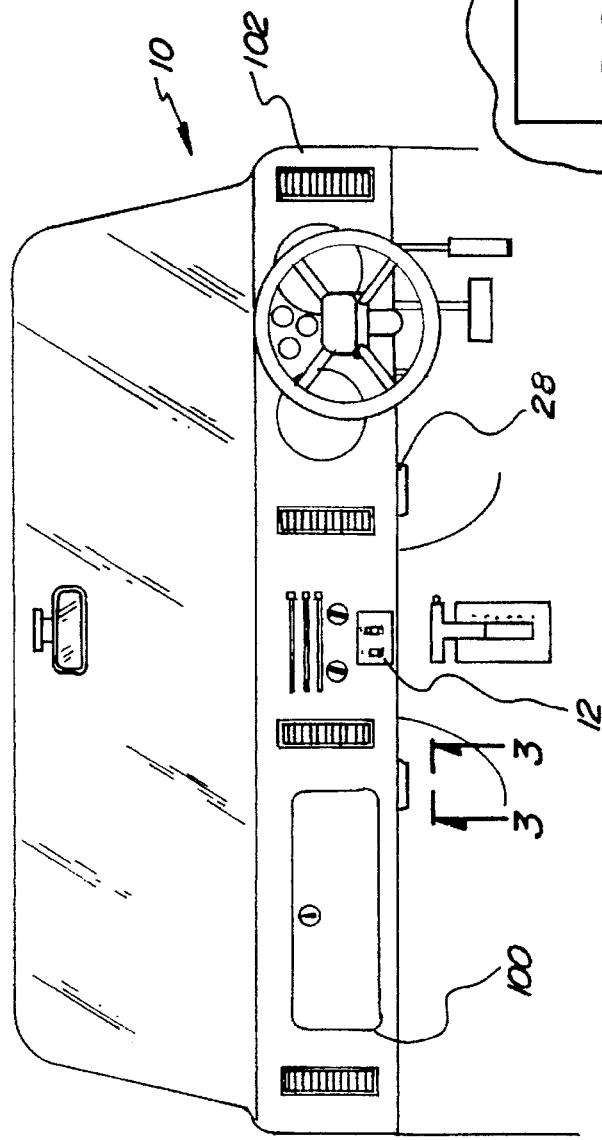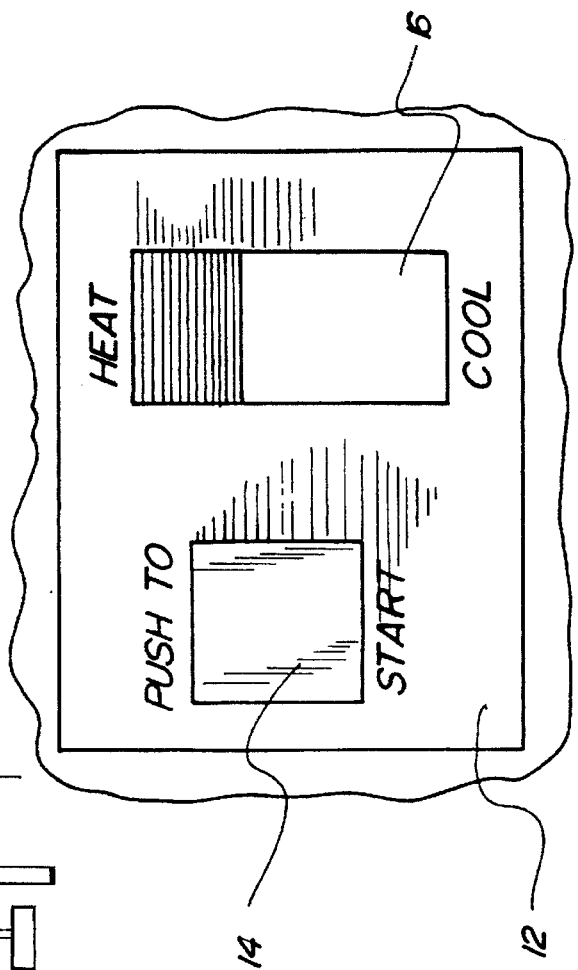

TIMER CONTROLLED HEATING AND COOLING APPARATUS FOR AN AUTOMOBILE

BACKGROUND OF THE INVENTION

1. Field of the Invention

The present invention relates to a timer controlled heating and cooling apparatus for an automobile and more particularly pertains to heating and cooling an interior of an automobile prior to a user's entrance with a timer controlled heating and cooling apparatus for an automobile.

2. Description of the Prior Art

The use of heating devices is known in the prior art. More specifically, heating devices heretofore devised and utilized for the purpose of heating a variety of mediums including automobiles are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,272,386 to Kephart discloses a programmable timer power switch unit with emergency override reset.

U.S. Pat. No. 5,129,376 to Parmley discloses a telephone automatic car starter.

U.S. Pat. No. 4,742,246 to Mori discloses a preheat timer for use in oven.

U.S. Pat. No. 4,458,663 to Kanesaka discloses a warming apparatus.

U.S. Pat. No. 4,350,287 to Richards discloses a remote control car heater.

U.S. Pat. No. 3,683,887 to Sammut discloses a timer controlled vehicle heater.

While these devices fulfill their respective, particular objective and requirements, the aforementioned patents do not describe a timer controlled heating and cooling apparatus for an automobile for heating and cooling an interior of an automobile prior to a user's entrance.

In this respect, the timer controlled heating and cooling apparatus for an automobile according to the present invention substantially departs from the conventional concepts and designs of the prior art, and in doing so provides an apparatus primarily developed for the purpose of heating and cooling an interior of an automobile prior to a user's entrance.

Therefore, it can be appreciated that there exists a continuing need for new and improved timer controlled heating and cooling apparatus for an automobile which can be used for heating and cooling an interior of an automobile prior to a user's entrance. In this regard, the present invention substantially fulfills this need.

SUMMARY OF THE INVENTION

In the view of the foregoing disadvantages inherent in the known types of heating devices now present in the prior art, the present invention provides an improved timer controlled heating and cooling apparatus for an automobile. As such, the general purpose of the present invention, which will be described subsequently in greater detail, is to provide a new and improved timer controlled heating and cooling apparatus for an automobile and method which has all the advantages of the prior art and none of the disadvantages.

To attain this, the present invention essentially comprises a control panel secured to a dashboard of an automobile. The control panel has an activation switch thereon. The control panel has a selector switch whereby a user can select a cool or a heat option. The control panel is secured in a position accessible to a driver. The control panel is electrically coupled to an existing car battery. At least one thermo electric heating and cooling mechanism is mounted to an underside of a dashboard of an automobile. The thermo electric heating and cooling mechanism is electrically coupled to the selector switch of the control panel and to an existing car battery. The thermo electric heating and cooling mechanism serves to selectively heat or cool an interior of an automobile. At least one vent is secured to affront surface of a corresponding thermo electric heating and cooling mechanism. The vent has an adjustable front surface whereby a user can direct flow of hot or cool air to a desired area of an interior of an automobile. A timer mechanism is secured to the control panel. The timer mechanism is electrically coupled to an existing car battery and to the selector switch of the control panel. The timer mechanism is preset to automatically activate and deactivate the thermo electric heating and cooling mechanism.

There has thus been outlined, rather broadly the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved timer controlled heating and cooling apparatus for an automobile which has all the advantages of the prior art heating devices and none of the disadvantages.

It is another object of the present invention to provide a new and improved timer controlled heating and cooling apparatus for an automobile which may be easily and efficiently manufactured and marketed.

It is a further object of the present invention to provide a new and improved timer controlled heating and cooling apparatus for an automobile which is of durable and reliable construction.

An even further object of the present invention is to provide a new and improved timer controlled heating and cooling apparatus for an automobile which is susceptible of a low cost of manufacture with regard to both materials and labor, and which accordingly is then susceptible of low prices of sale to the consuming public, thereby making such a timer controlled heating and cooling apparatus for an automobile economically available to the buying public.

Still yet another object of the present invention is to provide a new and improved timer controlled heating and cooling apparatus for an automobile which provides in the apparatuses and methods of the prior art some of the advantages thereof, while simultaneously overcoming some of the disadvantages normally associated therewith.

Even still another object of the present invention is to provide a new and improved timer controlled heating and cooling apparatus for an automobile for heating and cooling an interior of an automobile prior to a user's entrance.

Lastly, it is an object of the present invention to provide a new and improved timer controlled heating and cooling apparatus for an automobile comprised of a control panel secured to a dashboard of an automobile. The control panel has an activation switch thereon. The control panel is secured in a position accessible to a driver. At least one thermo electric mechanism is mounted to an underside of a dashboard of an automobile. The thermo electric mechanism is electrically coupled to the control panel and to an existing car battery. The thermo electric mechanism serves to control the temperature of an interior of an automobile. At least one vent is secured to a front surface of a corresponding thermo electric mechanism.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front view of the preferred embodiment of the timer controlled heating and cooling apparatus for an automobile constructed in accordance with the principles of the present invention.

FIG. 2 is a front view of the control panel of the present invention.

The same reference numerals refer to the same parts through the various Figures.

DESCRIPTION OF THE PREFERRED EMBODIMENT

Figure 3:
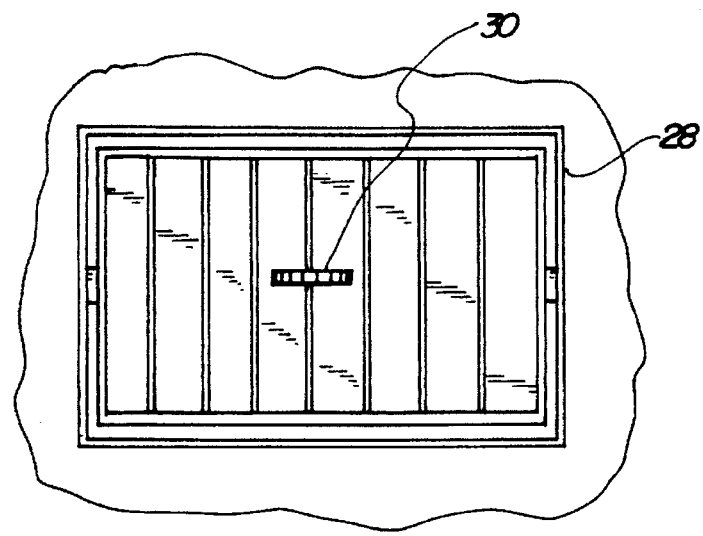
FIG. 3 is a cross-sectional view as taken along line 3—3 of FIG. 1.
Figure 4:
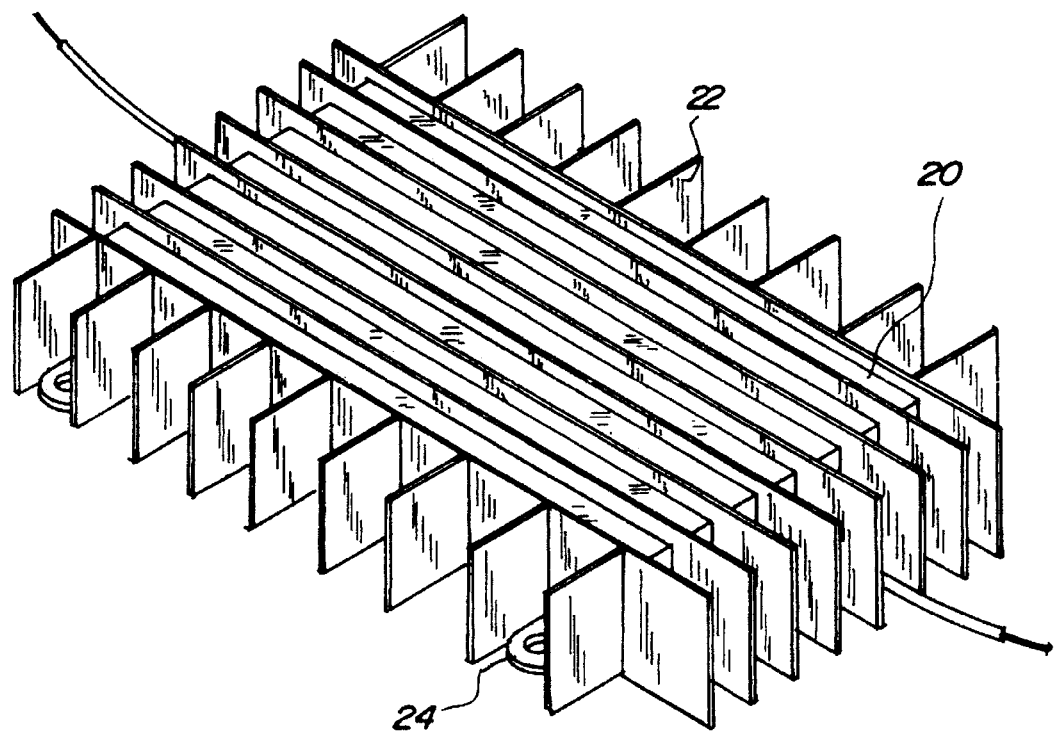
FIG. 4 is a perspective view of the thermoelectric cooler/heater of the present invention.
Figure 5:
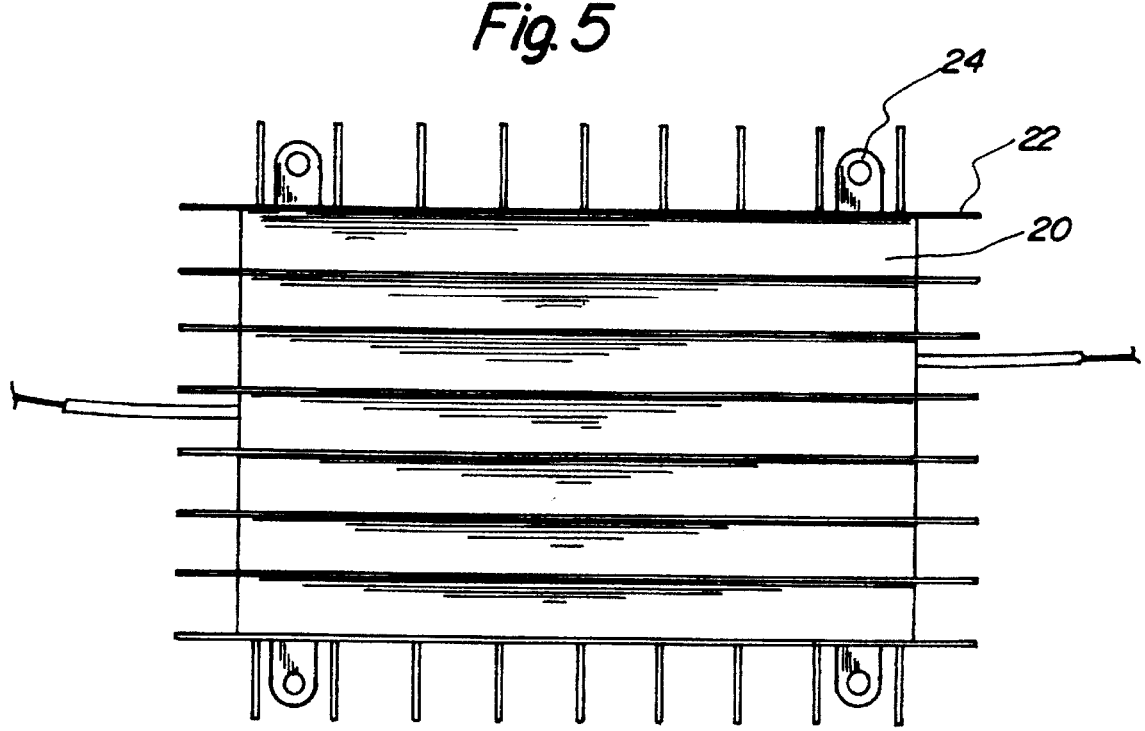
FIG. 5 is a front view of the thermo-electric cooler/heater of the present invention.
Figure 6:
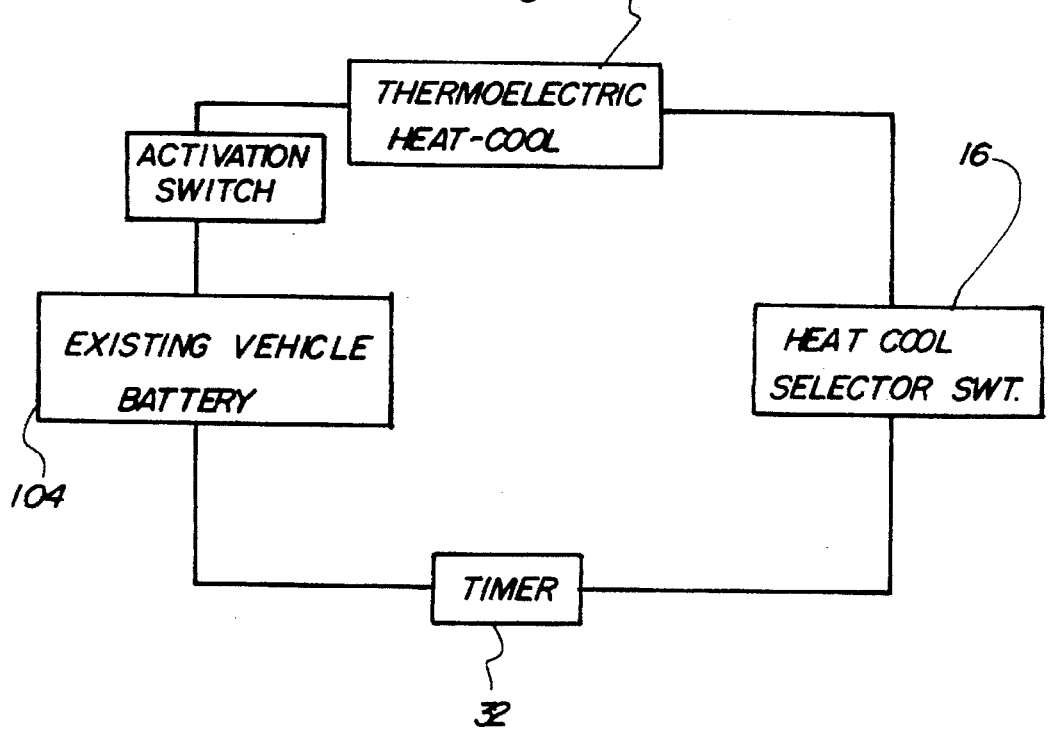
FIG. 6 is a block diagram of the timer controlled heating and cooling apparatus for an automobile.

With reference now to the drawings, and in particular, to FIG. 1 thereof, the preferred embodiment of the new and improved timer controlled heating and cooling apparatus for an automobile embodying the principles and concepts of the present invention and generally designated by the reference number 10 will be described.

Specifically, it will be noted in the various Figures that the device relates to a new and improved timer controlled heating and cooling apparatus for an automobile for heating and cooling an interior of an automobile prior to a user's entrance. In its broadest context, the device consists of a control panel, at least one thermo electric heating and cooling mechanism, at least one vent, and a timer mechanism. Such components are individually configured and correlated with respect to each other so as to attain the desired objective.

The first component of the device 10 is a control panel 12. The control panel 12 is secured to a dashboard 100 of an automobile 102. The control panel 12 has an activation switch 14 thereon. The control panel 12 has a selector switch 16 whereby a user can select a cool or a heat option. The control panel 12 is secured in a position accessible to a driver. The control panel 12 is electrically coupled to an existing car battery 104.

The second component of the device 10 is at least one thermo electric heating and cooling mechanism 20. The thermo electric heating and cooling mechanism 20 is mounted to an underside of a dashboard 100 of an automobile 102. The thermo electric heating and cooling mechanism 20 is electrically coupled to the selector switch 16 of the control panel 12 and to an existing car battery 104. The thermo electric heating and cooling mechanism 20 serves to selectively heat or cool an interior of an automobile 102. The thermo electric heating and cooling mechanism 20 has a bracket 22 with four mounting holes 24 to easily allow the mechanism 20 to be secured to the dashboard 100. Alternatively, the mechanism 20 could be utilized to just heat or cool depending upon the climatic conditions that the user lives in, i.e. a person living in Hawaii would not require the heating option while a person living in northern Alaska would not require the cooling option.

The third component of the device 10 is at least one vent 28. The vent 28 is secured to a front surface of a corresponding thermo electric heating and cooling mechanism 20. The vent 28 has an adjustable front surface 30 whereby a user can direct flow of hot or cool air to a desired area of an interior of an automobile 102.

The final component of the device 10 is a timer mechanism 32. The timer mechanism 32 is secured to the control panel 12. The timer mechanism 32 is electrically coupled to an existing car battery 104 and to the selector switch 16 of the control panel 12. The timer mechanism 32 is preset to automatically activate and deactivate the thermo electric heating and cooling mechanism 20. The user can determine when they want the device 10 to be activated so that when they enter into the automobile 102, the desired temperate conditions have already been met. The timer mechanism 32 and the thermo electric heating and cooling mechanism 20 could alternatively be equipped with small batteries so as not to feed off of the car battery 104. Such small batteries could be coupled with the automobiles 102 alternator for their recharge.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed as being new and desired to be protected by LETTERS PATENT of the United States is as follows:

1. A timer controlled heating and cooling apparatus for an automobile for heating and cooling an interior of an automobile prior to a user's entrance comprising, in combination:

a control panel secured to a dashboard of an automobile in a position visibly accessible to a user, the control panel having an activation switch thereon, the control panel having a selector switch whereby a user can select a cool or a heat option, the control panel secured in a position accessible to a user, the control panel electrically coupled to an existing car battery;

at least one thermo electric heating and cooling mechanism mounted to an underside of a dashboard of an automobile, the thermo electric heating and cooling mechanism electrically coupled to the selector switch of the control panel and to an existing car battery, the thermo electric heating and cooling mechanism serving to selectively heat or cool an interior of an automobile;

at least one vent secured to a front surface of a corresponding thermo electric heating and cooling mechanism, the vent having an adjustable front surface whereby a user can direct flow of hot or cool air to a desired area of an interior of an automobile;

a timer mechanism secured to the control panel, the timer mechanism electrically coupled to an existing car battery and to the selector switch of the control panel, the timer mechanism preset to automatically activate and deactivate the thermo electric heating and cooling mechanism.

\* \* \* \* \*